(12) United States Patent
Martin et al.

(10) Patent No.: US 6,901,904 B1
(45) Date of Patent: Jun. 7, 2005

(54) SEALING INTERSECTING VANE MACHINES

(75) Inventors: Jedd N. Martin, Providence, RI (US); Stephen M. Chomyszak, Attleboro, MA (US)

(73) Assignee: Mechanology, LLC, Attleboro, MA (US)

(*) Notice: Subject to any disclaimer, the term of this patent is extended or adjusted under 35 U.S.C. 154(b) by 0 days.

(21) Appl. No.: 10/744,229

(22) Filed: Dec. 22, 2003

(51) Int. Cl.$^7$ ............................................. F02B 53/04
(52) U.S. Cl. ....................... 123/221; 418/207; 418/195
(58) Field of Search ....................... 123/221; 418/207, 418/195

(56) References Cited

U.S. PATENT DOCUMENTS

| | | | | |
|---|---|---|---|---|
| 2,674,982 A | * | 4/1954 | McCall | 123/221 |
| 3,208,437 A | * | 9/1965 | Coulter | 123/221 |
| 3,481,313 A | * | 12/1969 | Isstas | 123/221 |
| 3,502,054 A | * | 3/1970 | Hambric | 123/221 |
| 3,809,022 A | * | 5/1974 | Dean, Jr. | 123/221 |
| 3,841,276 A | * | 10/1974 | Case | 123/221 |
| 4,005,682 A | * | 2/1977 | McCall et al. | 123/221 |
| 5,233,954 A | | 8/1993 | Chomyszak | 123/221 |
| 6,230,681 B1 | * | 5/2001 | Kiseljev et al. | 123/221 |
| 6,729,295 B2 | | 5/2004 | Tomczyk | 123/221 |

FOREIGN PATENT DOCUMENTS

| | | | | |
|---|---|---|---|---|
| DE | | 4127870 A1 | * 1/1992 | F01C 3/02 |
| EP | | 91975 A1 | * 10/1983 | F01C 3/00 |
| WO | WO 9114859 A1 | | * 10/1991 | F01C 3/02 |

* cited by examiner

*Primary Examiner*—Thai-Ba Trieu
(74) *Attorney, Agent, or Firm*—Elmore, Craig & Vanstone, P.C.; Carolyn S. Elmore; Anne I. Craig

(57) ABSTRACT

The invention provides a toroidal intersecting vane machine incorporating intersecting rotors to form primary and secondary chambers whose porting configurations minimize friction and maximize efficiency. Specifically, it is an object of the invention to provide a toroidal intersecting vane machine that greatly reduces the frictional losses through intersecting surfaces without the need for external gearing by modifying the width of one or both tracks at the point of intermeshing. The inventions described herein relate to these improvements.

23 Claims, 4 Drawing Sheets

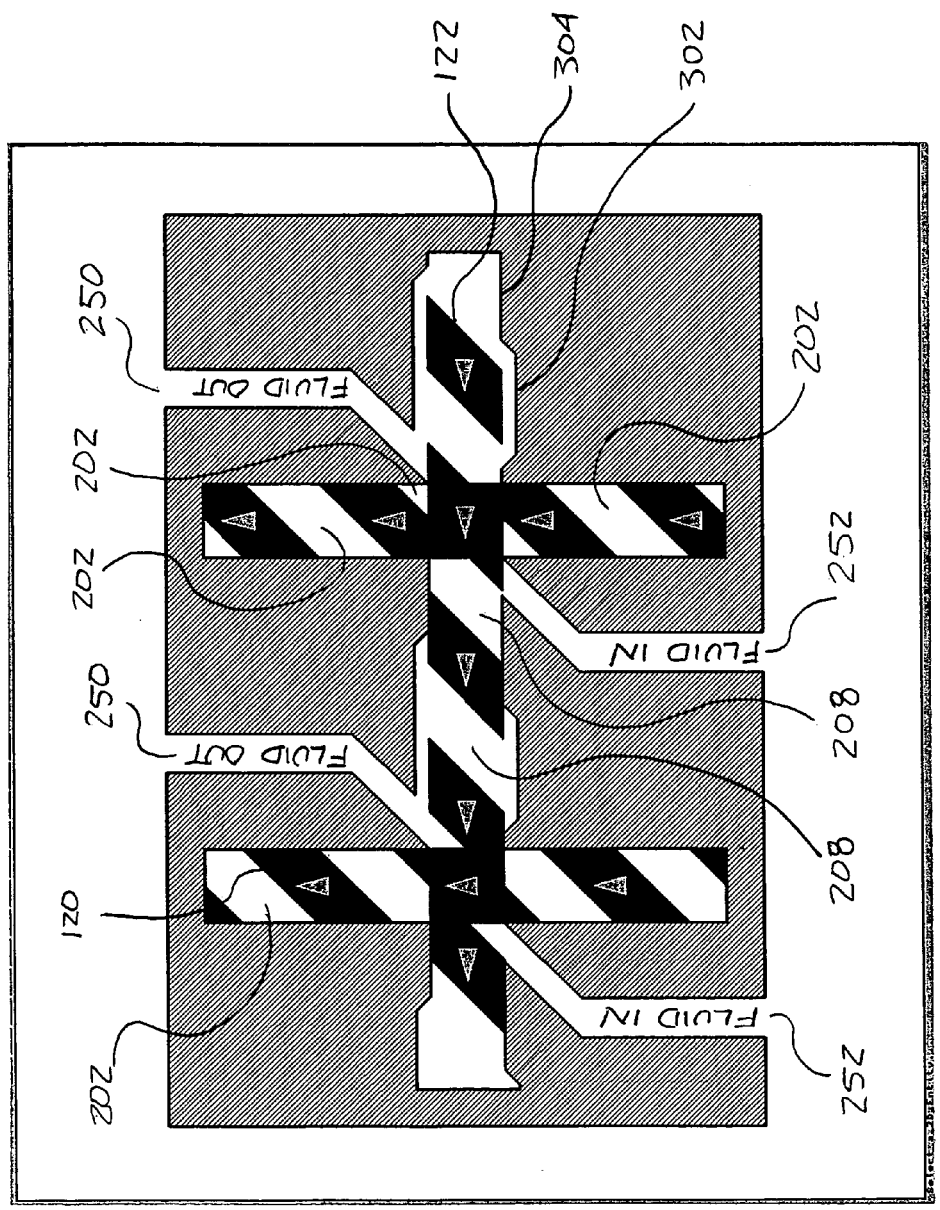

SEALING INTERSECTING VANE MACHINES

GOVERNMENT SUPPORT

The invention was supported, in whole or in part, by a grant from Department of Energy. The Government has certain rights in the invention.

BACKGROUND OF THE INVENTION

Machines incorporating intermeshing rotors have been described. See Chomyszak U.S. Pat. No. 5,233,954, issued Aug. 10, 1993 and Tomcyzk, United States Patent Application Publication 2003/0111040, published Jun. 19, 2003. The contents of the patent and publication are incorporated herein by reference in their entirety. In order for intersecting vane machines to function as compressors or expanders, chambers holding gas must be sealed. Sealing such machines has proven to be difficult. Vane seals often break or wear at an undesirable rate. Thus, a need exists to improve sealing intersecting vane machines.

SUMMARY OF THE INVENTION

Accordingly, it is an object of this invention to provide an intersecting vane machine, such as a toroidal intersecting vane machine, incorporating intersecting rotors to form primary and secondary chambers whose porting configurations minimize friction and maximize efficiency. Specifically, it is an object of the invention to provide a toroidal intersecting vane machine that greatly reduces the frictional losses through the meshing surfaces without the need for external gearing by modifying the function of one or the other of the rotors from that of "fluid moving" to that of "valving" thereby reducing the pressure loads and associated inefficiencies at the interface of the meshing surfaces. The inventions described herein relate to these improvements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2B shows a schematic of an embodiment of an expander of the present invention wherein one track is wider at the point of intersection.

DETAILED DESCRIPTION OF THE INVENTION

The invention provides a substantially improved intersecting vane machine, such as a toroidal intersecting vane machine, herein disclosed. The invention has two or more rotors rotatably mounted within a supporting structure so that the vanes of each of the rotors pass through a common region or intersection. Between the vanes of each primary rotor exists chambers which contain and exchange a working fluid. Changes in volume of the chambers are made possible by the interaction of the vanes. Because the rotors and their vanes continuously rotate, they create a cyclic positive displacement pumping action which enables the processing of a working fluid. If heat is added to the process then the machine can be used as an engine. If heat is removed from the process then the machine can be used as a refrigeration device.

Toroidal geometry, on which this invention and its following embodiments are preferably based, provides a very flexible design platform. Not only does it allow for a very compact mechanical package but provides numerous attributes which can be adjusted so as to optimize the pumping action and benefit the thermodynamic cycles which the invention may utilize. A key feature of this invention is its ability to allow configurable volumetric ratios between the initial and final volume of its working fluid with less frictional losses.

Figure 1:
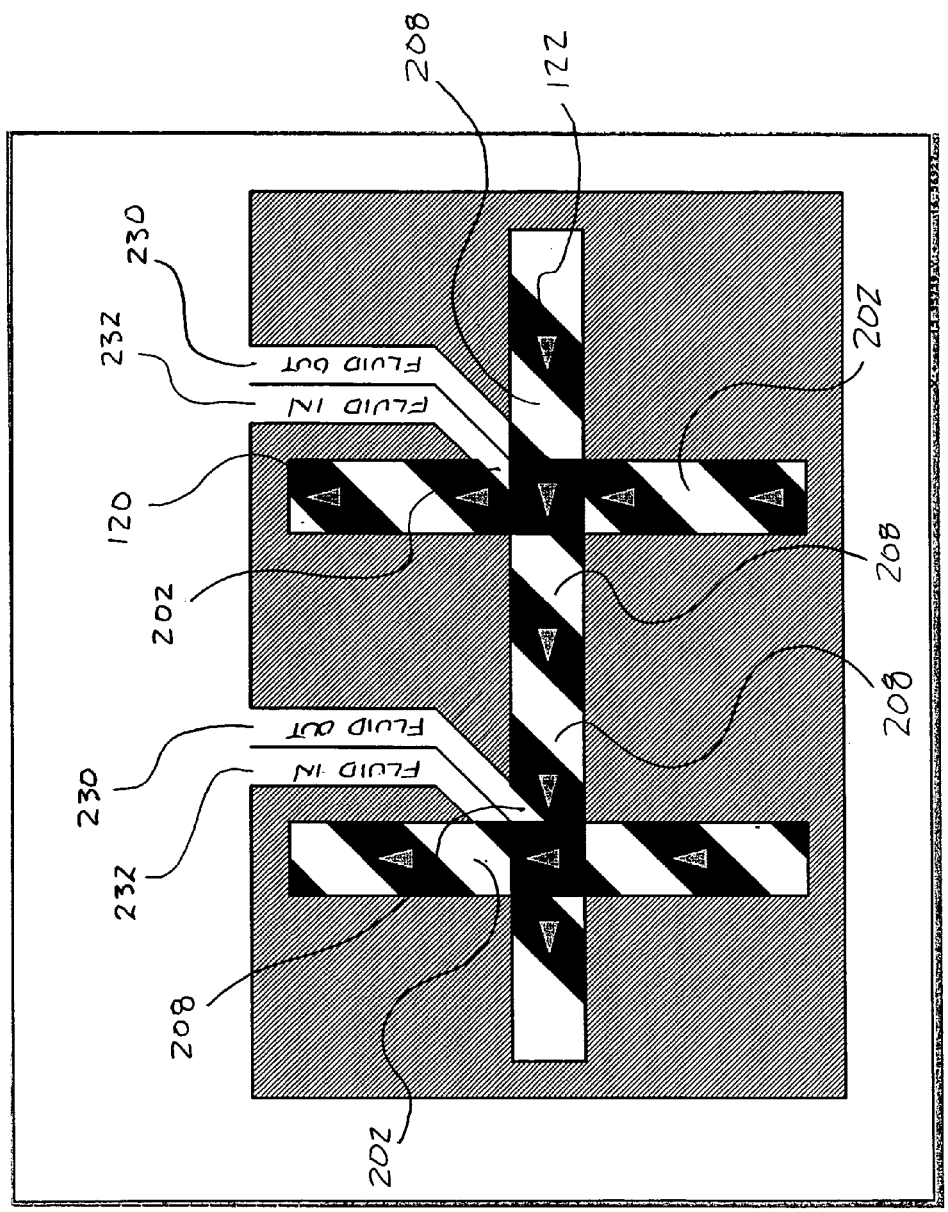
FIG. 1 shows a schematic of the prior art invention wherein the tracks of the first rotor and second rotor are substantially constant in their widths.

FIG. 1 shows a schematic of a prior invention wherein both the first and second rotor possess uniform width of track. Secondary vanes 202 intersect with primary vanes 208; secondary chamber 202 is in fluid communication with an outlet port 230; primary chamber 208 is in fluid communication with an inlet port 232. This machine had the disadvantage of maintaining frictional losses during the entire cycle, not just when the chamber was under pressure. The frictional losses not only resulted in decreased efficiency for the machine, but also unnecessary wear on the seals.

Figure 2A:
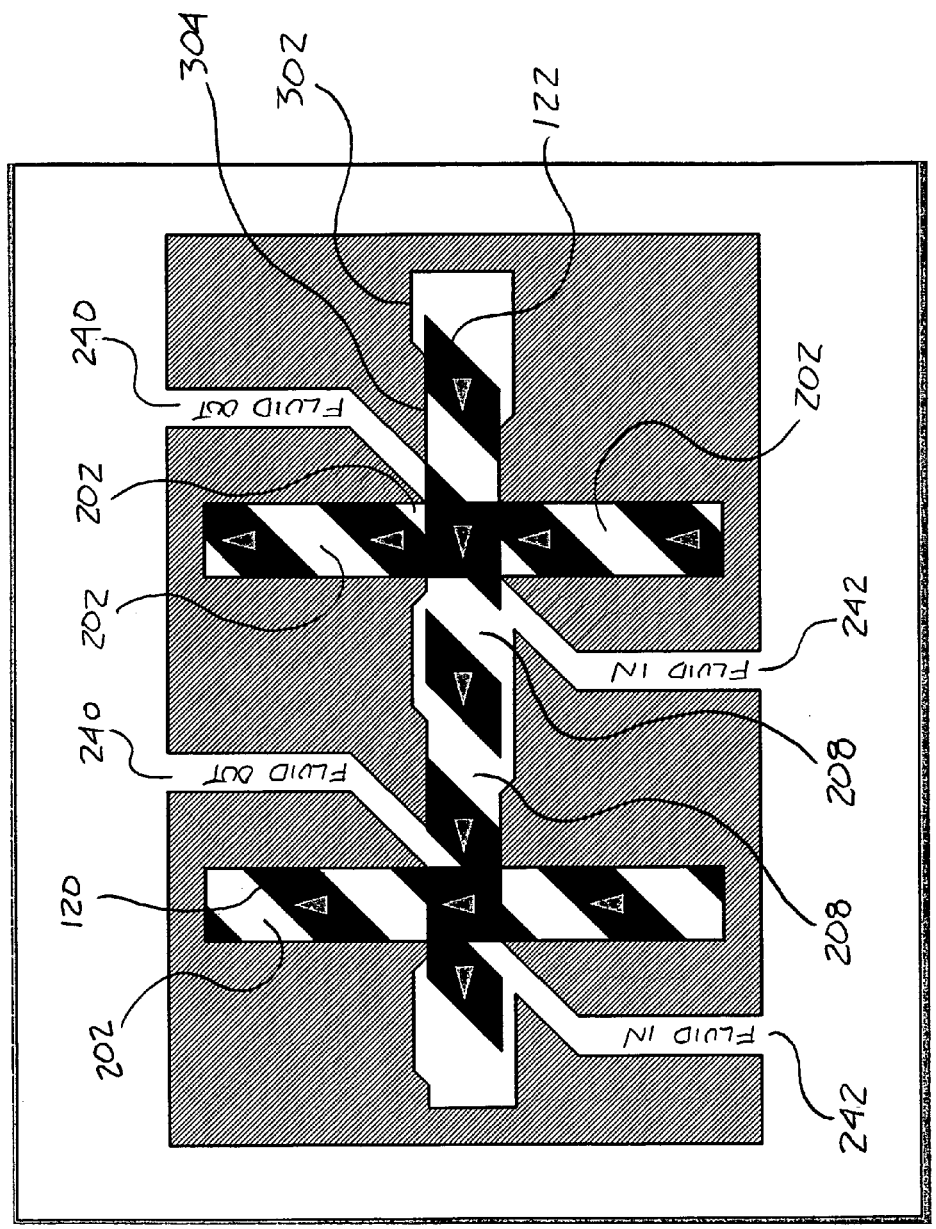
FIG. 2A shows a schematic of an embodiment of a compressor of the present invention wherein one track is wider at the point of intersection.

FIG. 2A shows a schematic of a compressor embodiment of the present invention. The widths of track 302 are wider at and proximal to the points of intersection (or those lengths of track where sealing is not desired) than the widths of the track 304 where the chamber is to be sealed. This configuration reduces frictional losses and increases the life of the seal. Further preferred embodiments illustrated in this figure include selective porting of the primary chamber, thereby eliminating selected ports. That is, compressor inlet port 242 is in fluid communication with primary chamber 208. Compressor outlet port 240 exhausts the compressed fluid. Secondary chamber 202 is not pressurized in this embodiment. Secondary vanes 120 intermesh with the primary vanes 122.

FIG. 2B shows a schematic of an expander embodiment of the present invention. The widths of track 302 are wider at and proximal to the points of intersection (or those lengths of track where sealing is not desired) than the widths of the track 304 where the chamber is to be sealed. This configuration also reduces frictional losses and increases the life of the seal. Further preferred embodiments illustrated in this figure include selective porting of the primary chamber, thereby eliminating selected ports. That is, expander inlet port 252 is in fluid communication with primary chamber 208. Expander outlet port 250 exhausts the compressed fluid. Secondary chamber 202 is not pressurized in this embodiment. Secondary vanes 120 intermesh with the primary vanes 122.

Figure 2C:
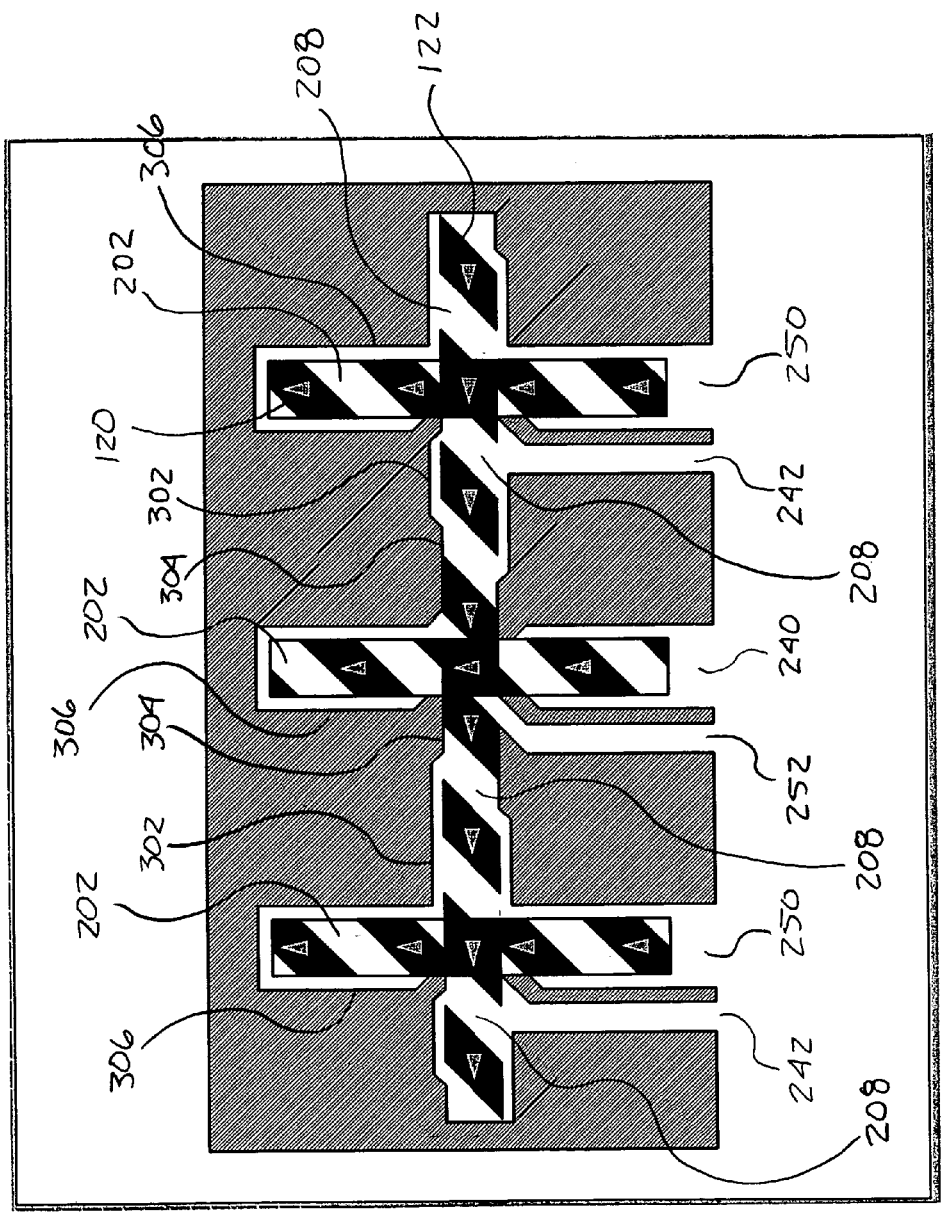
FIG. 2C shows a schematic of an embodiment of a compressor/expander of the present invention wherein selected tracks are wider at the point of intersection.

FIG. 2C depicts a combination of the compressor and expanders depicted in FIGS. 2A and 2B. The numbering convention of the previous figures has been preserved.

The vanes of the rotors only need to maintain a seal during the compression and expansion phases. Because these phases occur in a relatively short time and within a small amount of actual rotor rotation, the friction due to sealing can be greatly reduced.

The invention relates to an intersecting vane machine, preferably a toroidal intersecting vane machine, which comprises a supporting structure, a first rotor and at least one intersecting second rotor rotatably mounted, wherein:

(a) said first rotor has a plurality of first vanes positioned on a radial surface of said first rotor, with spaces between said first vanes and said surface defining a plurality of primary chambers, which said first vanes and said primary chambers travel in a primary track;

(b) said second rotor has a plurality of secondary vanes positioned on a radial surface of said second rotor, with spaces between said secondary vanes and said surface defining a plurality of secondary chambers, which said secondary vanes and said secondary chambers travel in a secondary track;

(c) one or more intake ports which each permit flow of a fluid into a primary chamber or secondary chamber and one or more exhaust ports which each permit flow of a fluid out of said primary or secondary chamber; and (d) wherein a first width of said primary track and/or said secondary track at each point of intersection is greater than a second width of said track between each point of intersection, thereby permitting sealing between the vanes and said track at said second width but not at said first width.

In another embodiment, the invention relates to an intersecting vane machine, which comprises a supporting structure having an inside surface, a first rotor and at least one intersecting second rotor rotatably mounted in said supporting structure, wherein:

(a) said first rotor has a plurality of first vanes positioned on a radially inner peripheral surface of said first rotor, with spaces between said first vanes and said surface defining a plurality of primary chambers, which said first vanes and said primary chambers travel in a primary track and wherein said vanes have a seal;

(b) an intake port which permits flow of a fluid into said primary chamber and an exhaust port which permits exhaust of the fluid out of said primary chamber;

(c) said second rotor has a plurality of secondary vanes positioned on a radially outer peripheral surface of said second rotor, with spaces between said secondary vanes and said surface defining a plurality of secondary chambers, which said secondary vanes and said secondary chambers travel in a secondary track;

(d) a first axis of rotation of said first rotor and a second axis of rotation of said second rotor arranged so that said axes of rotation do not intersect, said first rotor, second rotor, first vanes and secondary vanes being arranged so that said first vanes and said secondary vanes intersect at only one location during their rotation; and (e) wherein a first width of said primary track at a point proximal to the point of intersection is greater than a second width of said primary track between each point of intersection and the primary chamber, thereby permitting sealing between said primary vanes and said primary track at said second width but not at said first width.

Where both tracks are to be used to compress or expand fluid, the track configuration of the invention can be used in both tracks and both sets of vanes can have seals. The seal can be disposed within the vane, on the vane or in the track. The seal can be one seal which is in contact with all surfaces of the track or two or three or more seals which are independently in contact with the surfaces, or walls, of the track. The seals should be disposed such that they provide a seal when in contact with the narrower lengths of the track.

Where only one of the tracks is to be used to compress or expand fluid, the track configuration need be only along the track that is to compress or expand the fluid. Thus, where the primary track compresses or expands the fluid, then the width of said secondary track can be substantially the same along the length of said secondary track. The secondary track need not be sealed at all. Thus, seals can be avoided for the secondary vanes. Of course, the opposite configuration is also possible, whereby the secondary vanes have the seal and the secondary track has the track configuration of the invention.

The difference in the width of said primary track along the length of said track is not necessarily critical. Generally, it will differ between about 2% and 10%.

The widths of the tracks are defined by sidewalls. Generally, the sidewalls will be substantially perpendicular to the peripheral surface. The walls can be manufactured from a single material, such as a molded plastic or a metal. The walls can be a single piece of material or, for example, interlocking separate materials. The change in width is preferably accomplished by a gradual change to reduce the shear forces upon the seal during engagement. This can be accomplished, for example, by presenting the wall in a convex curve, relative to the inside of the track. Alternatively, the wall can present an obtuse angle. Often, the angle, including the tangential angle in the case of a curve, will be greater than 90°, preferably greater than 100°, such as about 135°.

In one embodiment, the machine is characterized by a plurality of equidistantly spaced secondary rotors.

In one embodiment, the machine can be self-synchronized via a leading meshing surface of a vane of one rotor driving the trailing meshing surface of a vane of another rotor or abutment, with the spacing of the vanes such that they are geometrically synchronized, thereby eliminating the use of an external gear train. For example, the leading surfaces of at least two consecutive primary vanes are in contact with the trailing surfaces of at least two consecutive secondary vanes. The embodiment relies upon the inherent design of the intersecting vane mechanism to provide related duties.

The advantage of self-synchronization is that the extra apparatus needed for external gearing can be eliminated with a savings in complexity and cost. The advantage of external gearing is that the driving loads between rotors are transmitted through the gears as opposed to the meshing surfaces of the vanes. In Applicants' work with a self-synchronized toroidal intersecting vane machine that was configured as an integral compressor and expander, testing showed that the frictional losses experienced via the meshing surfaces were a significant source of inefficiency but that the addition of external gearing to alleviate this problem was prohibitively complex and expensive.

The machine can have a wide range of gear ratios. In one embodiment, the second rotors have a number of said secondary vanes equal to (1/GEAR RATIO)×(number of said primary vanes on said first rotor) where GEAR RATIO equals revolutions of each of said second rotors per revolution of said first rotor. Preferably, the gear ratio is at least 1:1, preferably at least 1.5:1.

Further, the machine can accommodate a large range of fluid flow rates and/or rotational speeds for each rotor. Of course, the fluid flow rate will be dependent upon the volume of each chamber and the rotational speed of the rotors. For example, the fluid flow rate can be greater than 0.005 cubic feet per minute (CFM), such as at least about 30 CFM, preferably at least about 250 CFM, or at least about 1000 CFM. Generally, the fluid flow rate will be less than 5 million CFM. The rotational speed of the rotors can also be varied widely. For example, the first rotor can rotate at a rate of less than 1 rotation per minute (RPM). However, it will generally rotate at much higher speeds, such as at least about 500 RPMs, preferably at least about 1000 RPMs, more preferably at least about 1500 RPMs. Similarly, the second rotors can rotate at a rate of less than 1 rotation per minute (RPM). However, it will generally rotate at much higher speeds, such as at least about 500 RPMs, preferably at least about 1000 RPMs, more preferably at least about 2000 RPMs.

In one embodiment, the total flow rate of fluid through the primary chambers can be at least 250 cubic feet per minute with a primary speed of said first rotor of at least 1700 rotations per minute. In one embodiment, the speed of said second rotors can be at least 3000 rotations per minute. In this preferred configuration, the ratio of the width of said secondary vanes to the width of said primary vanes can be less than 1:1, preferably less than 0.5:1. The primary chamber volume can be at least about 0.75 cubic inches, and/or the secondary chamber volume can be less than about 0.5 cubic inches.

In another embodiment, the porting configuration is reversed, as compared to the above. Thus, the secondary chambers are ported, allowing pressurization of the secondary chambers, and the primary chambers are not ported and are not pressurized. Porting of the chambers can also be done in multiple configurations. For example, the exhaust port can be located in or along the primary and/or secondary track (generally, in the track which is not working as a compressor or expander) or in a separate conduit opening into the primary chambers. Likewise, the input port can be via a separate conduit. Usually, the intake port is located proximally to the point of intersection of the primary vanes and secondary vanes and the input port is not in fluid communication with a pressurized exhaust port.

The machine can be configured as a compressor or pump with an external means for supplying input power connected to drive said first and/or second rotors or can be configured as an expander with an external means for using output power connected to said first and/or second rotors or combination thereof. Further, it can be configured as a combustion engine by including a fuel igniter.

The application of the improvements described herein can be applied to the machines described in U.S. Pat. No. 5,233,954 issued Aug. 10, 1993 and Tomcyzk, United States Patent Application Publication 2003/0111040, published Jun. 19, 2003 and other toroidal and/or cylindrical vane machines. The contents of the patent and publication are incorporated herein by reference in their entirety. It should now be readily apparent to those skilled in the art that a novel toroidal intersecting vane machine capable of achieving the stated objects of the invention has been provided.

The foregoing dimensions and ranges are set forth solely for the purpose of illustrating typical device dimensions. The actual dimensions of a device constructed according to the principles of the present invention may obviously vary outside of the listed ranges without departing from those basic principles. It should further be apparent to those skilled in the art that various changes in form and details of the invention as shown and described may be made. It is intended that such changes be included within the spirit and scope of the claims appended hereto.

What is claimed is:

1. An intersecting vane machine, which comprises a supporting structure, a first rotor and at least one intersecting second rotor rotatably mounted, wherein:
   (a) said first rotor has a plurality of first vanes positioned on a radial surface of said first rotor, with spaces between said first vanes and said surface defining a plurality of primary chambers, which said first vanes and said primary chambers travel in a primary track;
   (b) said second rotor has a plurality of secondary vanes positioned on a radial surface of said second rotor, with spaces between said secondary vanes and said surface defining a plurality of secondary chambers, which said secondary vanes and said secondary chambers travel in a secondary track;
   (c) one or more intake ports which each permit flow of a fluid into a primary chamber or secondary chamber and one or more exhaust ports which each permit flow of a fluid out of said primary or secondary chamber; and
   (d) wherein a first width of said primary track and/or said secondary track at each point of intersection is greater than a second width of said primary and/or secondary track between each point of intersection, thereby permitting sealing between vanes in said primary and/or secondary track at said second width but not at said first width.

2. The intersecting vane machine of claim 1 wherein said machine is a toroidal intersecting vane machine.

3. An intersecting vane machine, which comprises a supporting structure having an inside surface, a first rotor and at least one intersecting second rotor rotatably mounted in said supporting structure wherein:
   (a) said first rotor has a plurality of first vanes positioned on a radially inner peripheral surface of said first rotor, with spaces between said first vanes and said surface defining a plurality of primary chambers, which said first vanes and said primary chambers travel in a primary track and wherein said vanes have a seal;
   (b) an intake port which permits flow of a fluid into said primary chamber and an exhaust port which permits exhaust of the fluid out of said primary chamber;
   (c) said second rotor has a plurality of secondary vanes positioned on a radially outer peripheral surface of said second rotor, with spaces between said secondary vanes and said surface defining a plurality of secondary chambers, which said secondary vanes and said secondary chambers travel in a secondary track;
   (d) a first axis of rotation of said first rotor and a second axis of rotation of said second rotor arranged so that said axes of rotation do not intersect, said first rotor, second rotor, first vanes and secondary vanes being arranged so that said first vanes and said secondary vanes intersect at only one location during their rotation; and
   (e) wherein a first width of said primary track at a point proximal to the point of intersection is greater than a second width of said primary track between each point of intersection and the primary chamber, thereby permitting sealing between said primary vanes and said primary track at said second width but not at said first width.

4. The machine of claim 3 wherein the width of said secondary track is substantially the same along the length of said secondary track.

5. The machine of claim 3 wherein difference in the width of said primary track along the length of said track is between about 2% and 10%.

6. The machine of claim 5 wherein the widths of said track is defined by sidewalls substantially perpendicular to the peripheral surface.

7. The machine of claim 6 wherein each of said sidewalls bend in an obtuse angle.

8. The machine of claim 6 wherein each of said sidewalls are curved.

9. The machine of claim 5 wherein the leading surfaces of at least two consecutive primary vanes are in contact with the trailing surfaces of at least two consecutive secondary vanes.

10. The machine of claim 5 wherein the ratio of the width of said secondary vanes to the width of said primary vanes is less than 1:1.

11. The machine of claim 10 wherein the ratio of the width of said secondary vanes to the width of said primary vanes is less than 0.5:1.

12. The machine of claim 5 wherein the exhaust port is located in the secondary track.

13. The machine of claim 5 wherein the intake port is located proximally to the point of intersection of the primary vanes and secondary vanes.

14. The machine of claim 5 characterized by a plurality of equidistantly spaced secondary rotors.

15. The machine of claim 3 in which said second rotors have a number of said secondary vanes equal to (1/GEAR RATIO)×(number of said primary vanes on said first rotor) where GEAR RATIO equals revolutions of each of said second rotors per revolution of said first rotor.

16. The machine of claim 15 in which said gear ratio is at least 1:1.

17. The machine of claim 15 in which said gear ratio is at least 1.5:1.

18. The machine of claim 3 in which the machine is configured as a compressor or pump with an external means for supplying input power connected to drive said first and/or second rotors or is configured as an expander with an external means for using output power connected to said first and/or second rotors or combination thereof.

19. The machine of claim 3 wherein the total flowrate of fluid through the primary chambers is at least 250 cubic fret per minute with a primary speed of said first rotor of at least 1700 rotations per minute.

20. The machine of claim 3 wherein the speed of said second rotors is at least 3000 rotations per minute.

21. The machine of claim 20 wherein the primary chamber volume is at least about 0.75 cubic inches.

22. The machine of claim 21 wherein the secondary chamber volume is less than about 0.5 cubic inches.

23. An intersecting vane machine, which comprises a supporting structure having an inside surface, a first rotor and at least one intersecting second rotor rotatably mounted in said supporting structure, wherein:

(a) said first rotor has a plurality of first vanes positioned on a radially inner peripheral surface of said first rotor, with spaces between said first vanes and said surface defining a plurality of primary chambers; which said first vanes and said primary chambers travel in a primary track;

(b) said second rotor has a plurality of secondary vanes positioned on a radially outer peripheral surface of said second rotor, with spaces between said secondary vanes and said surface defining a plurality of secondary chambers, which said secondary vanes and said secondary chambers travel in a secondary track and said secondary vanes have a seal;

(c) an intake port which permits flow of a fluid into said secondary chamber and an exhaust port which permits exhaust of the fluid out of said secondary chamber;

(d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes intersect at only one location during their rotation; and (e) wherein a first width of said secondary track at a point proximal to the point of intersection is greater than a second width of said secondary track between each point of intersection and the secondary chamber, thereby permitting sealing between said secondary vanes and said secondary track at said second width but not at said first width.

* * * * *